United States Patent Office 2,748,117
Patented May 29, 1956

2,748,117

QUINOXALINIUM SALTS

Jean Druey, Riehen, and Albrecht Hueni, Basel, Switzerland, assignors to Ciba Pharmaceutical Products, Inc., Summit, N. J.

No Drawing. Application May 27, 1953,
Serial No. 357,903

Claims priority, application Switzerland May 30, 1952

8 Claims. (Cl. 260—250)

The present invention relates to new 1-($R_2$)-3-($R_1$)-quinoxalinium salts which can be represented by the formula $$\left[ R_5 \underset{R_4}{\overset{R_6}{\underset{7}{\bigcirc}}} \underset{8}{\overset{5}{\underset{1}{\bigcirc}}} \underset{R_3}{\overset{4}{\underset{N}{\bigcirc}}} \underset{R_2}{\overset{3}{\underset{1}{\bigcirc}}} R_1 \right]^+ A^-$$

and their corresponding pseudo bases, wherein $R_1$ represents a phenyl or thienyl radical, $R_2$ a lower dialkylaminoalkyl, lower dialkylaminoalkylthioalkyl, lower alkyleneaminoakyl, or lower hydroxyalkyl radical, and each of $R_3$, $R_4$, $R_5$ and $R_6$ represents hydrogen, a lower alkyl or halogen radical, and $A^-$ stands for an anion.

The above formula also comprises quinoxalinium salts, containing in 1-position one of the aforementioned aminoalkyl groups, in the form of their acid addition salts.

The $R_1$ radical can be unsubstituted or substituted, for example by a lower alkyl group or one or more halogen atoms. By "alkyleneamino" is meant an alicyclic amino group, such as a piperidino, pyrrolidino or morpholino group. The anion $A^-$ is more particularly the acid radical of a strong inorganic or organic acid suitable for the preparation of therapeutically useful and non-toxic salts, for example a hydrohalic acid, such as hydrochloric acid, or sulfuric acid, nitric acid, perchloric acid, a sulfonic acid such as para-toluene sulfonic acid or methane sulfonic acid, or an alkyl sulfuric acid, such as methyl sulfuric acid, furthermore organic carboxylic acids, for example acetic acid, tartaric acid, citric acid, ascorbic acid, benzoic acid, or the hydroxyl ion.

The new compounds possess valuable therapeutic properties and can be used as medicaments, more particularly as cardiacs. Compounds comprising the invention exhibit a cardiac activity with systolic contracture.

Especially valuable are the 1-(dialkylamino- or alkyleneamino-alkyl)-3-phenyl-quinoxalinium salts, and primarily 1-($\beta$-diethylamino-ethyl)-3-phenyl-quinoxalinium salts such as the chloride-hydrochloride of the formula $$\left[ \underset{\underset{CH_2-N(C_2H_5)_2}{CH_2}}{\bigcirc} \underset{N}{\overset{N}{\bigcirc}} \bigcirc \right]^+ Cl^- \cdot HCl$$

Also of importance are 1-hydroxyalkyl-3-phenyl-quinoxalinium salts, and especially 1-($\beta$-hydroxyethyl)-3-phenyl quinoxalinium salts such as the chloride of the formula $$\left[ \underset{\underset{CH_2OH}{CH_2}}{\bigcirc} \underset{N}{\overset{N}{\bigcirc}} \bigcirc \right]^+ Cl^-$$

The new compounds are obtained by reacting together compounds of the formulae $$R_5 \underset{R_4}{\overset{R_6}{\bigcirc}} \underset{}{\overset{NH_2}{\underset{NH}{\bigcirc}}} \underset{R_3}{\overset{}{\bigcirc}}$$

(I)

and $$\underset{X=C-H}{O=C-R_1}$$

(II)

wherein $R_1$, $R_2$, $R_3$, $R_4$, $R_5$ and $R_6$ have the previously indicated significances, and X stands for oxygen or the group $=NOH$ or for a hydrogen atom and a halogen atom, such as chlorine or bromine, and resultant partially hydrogenated quinoxalines are converted by oxidation into quinoxalinium compounds.

Accordingly, there may be reacted for example N-dialkyl-aminoalkyl-, N-alkylene-aminoalkyl- or N-hydroxyalkyl- ortho-phenylene diamines with $\alpha,\beta$-dioxo compounds or their monoximes corresponding to Formula II. Such compounds are for example isonitroso-acetophenones, isonitroso-acetothienones or phenylglyoxals. Instead of the $\alpha,\beta$-dioxo compounds mentioned, there can also be used corresponding $\alpha$-oxo-$\beta$-halogen compounds, such as $\omega$-halogen-acetophenones or $\omega$-halogen-acetothienones.

Another method of preparation is to start from a partially hydrogenated, correspondingly substituted quinoxaline, such for example as tetrahydroquinoxaline, and to convert this by oxidation into the quinoxalinium salt.

The oxidation of the aforementioned partially hydrogenated quinoxalines, such as dihydroquinoxalines or tetrahydroquinoxalines, is carried out by treatment with mild oxidizing agents. Thus, for example, the tetrahydro compounds are advantageously oxidized by the addition of potassium ferricyanide. However, the 1,2-dihydroquinoxalines frequently undergo oxidation to the corresponding quinoxalinium compounds, under the reaction conditions selected for their preparation, either by the action of oxygen of the air or by disproportioning.

The new compounds can also be obtained by a further form of the process in which a quinoxaline of the formula $$R_5 \underset{R_4}{\overset{R_6}{\bigcirc}} \underset{N}{\overset{N}{\bigcirc}} R_1$$

is quaternized with a reactive ester of the formula $$R_2 A$$

$R_1$, $R_2$, $R_3$, $R_4$, $R_5$ and $R_6$ having the meanings given above and A representing the acid radical of a strong organic or inorganic acid.

In this manner, for example, 2-phenyl-quinoxalines or 2-thienyl-quinoxalines can be reacted with esters of lower aliphatic alcohols and hydrohalic acids, as for example ethylene-chlorohydrin or 1-chloro-propanediol-(2,3).

Depending on the working conditions, either the quinoxalinium salts or their corresponding pseudo bases are formed. The latter can also be prepared from the salts by treatment with alkalies, and can be converted with acids into the corresponding therapeutically useful and non-toxic quinoxalinium salts, and, if they contain in 1-position one of the aforementioned aminoalkyl groups, into their therapeutically useful and non-toxic acid addition salts, advantageously by reaction with strong inorganic or organic acids, for example a hydrohalic acid, such as hydrochloric acid, or sulfuric acid, phosphoric acid, perchloric acid, a sulfonic acid such as toluene sulfonic acid or ethane sulfonic acid, or an alkyl-sulfuric acid, such as methylsulfuric acid, and also with organic carboxylic acids, for example acetic acid, tartaric acid, citric acid, ascorbic acid or benzoic acid. When the compounds obtained contain also a quaternatable group, they can be further converted into quaternary ammonium compounds with quaternating agents, as e. g. alkyl halides or alkyl sulfates.

Depending on the reaction components, the reactions described may be conducted in the presence or absence of a diluent, for example, an alcohol, water, glacial acetic acid, dioxane, a ketone such as acetone, an ester such as ethyl acetate, a hydrocarbon such as benzene or toluene, or an ether, at ordinary or preferably at a raised temperature in an open vessel or in a closed vessel under pressure. Equimolecular quantities of the reactants or an excess of one reactant may be used. It may also be of advantage, depending on the reaction components used, to work in the presence of a condensing agent, for example, agents, capable of splitting off water and/or acid and/or catalysts, and/or to remove water formed during the reaction by known physical methods.

The compounds used as starting materials are in part known or can be obtained by methods in themselves known.

The following examples illustrate the invention, the parts being by weight unless otherwise stated and the relationship between parts by weight and parts by volume being the same as that of the gram to the cubic centimeter. The temperatures are in degrees centigrade. Percentages are by weight.

*Example 1*

215 parts of N-(β-diethylamino-ethyl)-orthophenylene diamine are mixed in 1000 parts by volume of absolute ethanol with an ethyl alcoholic solution of hydrochloric acid until the solution just reacts acid towards Congo, and then heated to the boil with 155 parts of isonitroso-acetophenone for 45 minutes under reflux. The solution is again mixed with an excess of ethyl alcoholic hydrochloric acid and the solution having a reaction distinctly acid to Congo is mixed with 3500 parts by volume of ethyl acetate. After standing for several days the crystalline brown-yellow precipitate is separated by filtering with suction and recrystallized several times from ethanol of 96 per cent. strength with the use of animal charcoal and the addition of ethyl acetate.

In this manner there is obtained 1-(β-diethylaminoethyl)-3-phenyl-quinoxalinium chloride hydrochloride of the formula

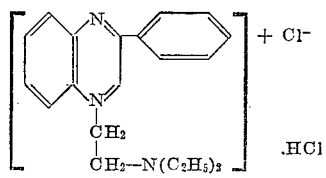

in the form of a yellow crystalline powder, which dissolves very easily in water and melts at 184–186° C. with decomposition. By mixing an aqueous solution thereof with aqueous caustic soda solution the corresponding pseudo base is obtained which can be recrystallized from a mixture of benzene and petroleum ether and melts at 93–95° C. It probably has the formula

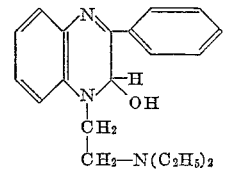

From this base the above named quinoxalinium salt can be obtained by mixing a solution of the base in ethyl alcohol with ethyl alcoholic hydrochloric acid and adding ethyl acetate.

In a similar manner other corresponding salts can be produced, e. g. with hydrogen iodide, the hydriodide (melting point 188–190° C. with decomposition), with nitric acid the nitrate (melting point 150–152° C. with decomposition), with sulfuric acid the sulfate (melting point 162–164° C. with decomposition), with phosphoric acid the phosphate (melting point 124–126° C. with decomposition), and with perchloric acid the perchlorate (melting point 187–188° C.). By reacting the said base with methyl iodide, a quaternary salt of melting point 146–147° C. (with decomposition) can be obtained, with dimethyl sulfate a quaternary salt of melting point 165–167° C., and with para-toluene sulfonic acid methyl ester a quaternary salt of melting point 186–187° C.

*Example 2*

207 parts of N-(β-diethylamino-ethyl)-orthophenylene diamine are heated in 1400 parts by volume of absolute ethanol with 155 parts of ω-chloro-acetophenone for a few hours at the boil under reflux. The solution is acidified with ethyl alcoholic hydrochloric acid until it has a strongly acid reaction to Congo, then mixed with ethyl acetate until greasy constituents begin to separate and allowing the whole to stand for a few days. The brown yellow crystalline precipitate is separated by filtering with suction and recrystallized several times from ethanol of 96 per cent. strength with the use of animal charcoal and the addition of ethyl acetate. In this manner the 1-(β-diethylamino-ethyl)-3-phenyl-quinoxalinium chloride hydrochloride described in Example 1 is obtained, which has apparently been formed from the expected 1-(β-diethylamino-ethyl)-3-phenyl-1:2-dihydroquinoxaline hydrochloride by oxidation.

*Example 3*

5 parts of N-(β-diethylamino-ethyl)-ortho-phenylenediamine are dissolved in 40 parts by volume of absolute ethanol, then mixed with an ethyl alcoholic solution of hydrochloric acid until the reaction is acid to Congo, and the whole is heated at the boil with 3.9 parts of phenyl-glyoxal hydrate for 2 hours under reflux. The solution is mixed with ethyl acetate until crystallization sets in. After prolonged standing the mixture is filtered with suction, and the product is recrystallized from ethanol of 96 per cent. strength with the use of animal charcoal and the addition of ethyl acetate. It is identical with the 1-(β-diethylaminoethyl)-3-phenyl-quinoxalinium chloride hydrochloride described in Example 1.

*Example 4*

20 parts of N-(β-diethylamino-ethyl)-orthophenylene diamine are reacted and worked up as described in Example 2 with 18.9 parts by weight of ω-chloro-4-chloro-acetophenone in 100 parts by volume of absolute ethanol.

The 1-(β-diethylamino-ethyl)-3-(4'-chloro-phenyl)-quinoxalinium-chloride-hydrochloride of the formula

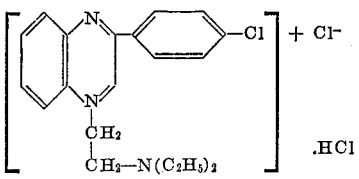

thus obtained melts at 192–194° C. with decomposition.

The same product is obtained by dissolving 28 parts of N-(β-diethylamino-ethyl)-ortho-phenylene-diamine-dihydrochloride in 300 parts by volume of hot absolute ethanol, adding ethyl alcoholic hydrochloric acid until the solution has an acid reaction, introducing 17.1 parts of para-chloro-ω-isonitroso-acetophenone, heating to the boil for 30 minutes, admixing the solution with ethyl acetate and absolute ether, separating the crystals which have formed and recrystallizing twice from ethanol of 96 per cent. strength.

Example 5

10.8 parts of N-(β-dimethylamino-ethyl)-ortho-phenylenediamine are dissolved in 80 parts by volume of absolute ethanol and admixed with 11 parts of 4-chloro-isonitroso-acetophenone. Ethyl alcoholic hydrochloric acid is added to the mixture until it is acid to Congo and it is then heated to the boil for 45 minutes under reflux. The solution is admixed with ethyl acetate until crystallization sets in and then allowed to stand for some time. The product is separated by filtering with suction and recrystallized several times from ethanol of 96 per cent. strength with an addition of ethyl acetate. The resultant 1-(β-dimethylamino-ethyl)-3-(4'-chloro-phenyl)-quinoxalinium-chloride hydrochloride of the formula

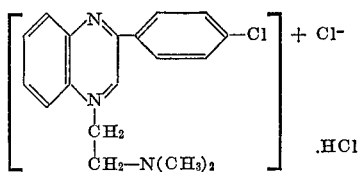

melts at 186–188° C. with decomposition.

Example 6

7.6 parts of N-(β-hydroxyethyl)-ortho-phenylenediamine are caused to react in 50 parts by volume of absolute ethanol with 9.3 parts of ω,4-dichloro-acetophenone as described in Example 2, and worked up. The resultant 1-(β-hydroxyethyl)-3-(4'-chloro-phenyl)-quinoxalinium-chloride of the formula

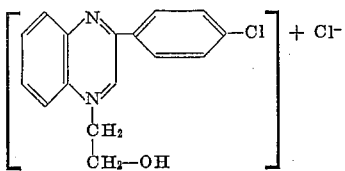

melts at 188–189° C. with decomposition.

Example 7

2.6 parts of 2-phenylquinoxaline are heated to 120–125° C. for several hours with 10 parts by volume of absolute ethanol and 3.5 parts of ethylene-chlorohydrin in a fusion tube. Absolute ether is admixed until the solution becomes turbid and it is then allowed to stand. The precipitated crystals are separated by suction-filtering, washed with absolute ether and recrystallized from ethanol of 96 per cent. strength with an addition of ethyl acetate. The resultant 1-(β-hydroxyethyl)-3-phenyl-quinoxalinium-chloride of the formula

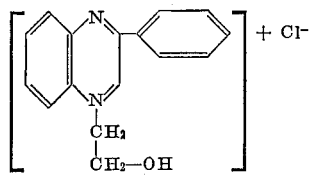

melts at 189–190° C. with decomposition.

The corresponding iodide melts at 202–204° C. with decomposition. When the etheral solution of the base of the above salt is treated with benzilic acid, the benzilate is obtained which melts at 158–160° C. with decomposition.

Example 8

7.6 parts of N-(β-hydroxyethyl)-ortho-phenylene diamine are dissolved in 40 parts by volume of absolute ethanol and the solution is rendered just acid to Congo by the addition of an ethyl alcoholic solution of hydrochloric acid. After the addition of 9.15 parts of 4-chloro-isonitroso-acetophenone the whole is heated at the boil for 45 minutes under reflux, then mixed with ethyl acetate until crystallization sets in, and, after a little time the cooled mixture is filtered with suction. After recrystallization from ethanol of 98 per cent. strength there is obtained the 1-(β-hydroxyethyl)-3-(4'-chlorophenyl)-quinoxalinium chloride described in Example 6.

Example 9

7.6 parts of N-(β-hydroxyethyl)-ortho-phenylene diamine are dissolved in 40 parts by volume of absolute ethanol and an ethyl alcoholic solution of hydrochloric acid is added until the solution just reacts acid to Congo. After the addition of 7.5 parts of isonitroso-acetophenone the whole is heated at the boil for 45 minutes under reflux, then further acidified with an ethyl alcoholic solution of hydrochloric acid, and mixed with ethyl acetate until greasy constitutents begin to separate. By the addition of a small quantity of absolute ethanol these constitutents are almost completely redissolved, and the crystals obtained after long standing are separated by filtering with suction. After recrystallization from ethanol with the addition of ethyl acetate there is obtained the 1-(β-hydroxyethyl)-3-phenyl-quinoxalinium chloride described in Example 7.

Example 10

8.7 parts of N-(β-dimethylamino-ethyl)-orthophenylene diamine are dissolved in 30 parts by volume of absolute ethanol and mixed with an ethyl alcoholic solution of hydrochloric acid until the reaction is acid to Congo. Then the solution is heated at the boil with 7.4 parts of isonitroso-acetophenone for 1 hour under reflux. After the addition of 30 parts by volume of absolute ethanol, the solution is mixed with ethyl acetate until it becomes turbid, and it is then cooled and allowed to stand. The crystallizate is separated by filtering with suction and recrystallized from ethanol of 95 per cent. strength with the use of animal charcoal and the addition of ethyl acetate and absolute ether. The resulting 1-(β-dimethylamino-ethyl)-3-phenyl-quinoxalinium chloride hydrochloride of the formula

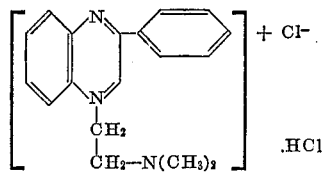

melts at 191–193° C. with decomposition.

Example 11

10.3 parts of N-(β-diethylamino-ethyl)-orthophenylene diamine are dissolved in 30 parts by volume of absolute ethanol, then mixed with 8.15 parts of 4-methylisonitroso-acetophenone, the mixture is rendered acid to Congo by means of a small excess of ethyl alcoholic solution of hydrochloric acid, and the whole is heated at the boil for 30 minutes, under reflux. The solution is mixed with ethyl acetate until turbidity sets in and is allowed to stand. The precipitated crystals are separated by filtering with suction and further crystals are obtained from the mother liquor by the addition of ethyl acetate and absolute ether. The second crystallization is 1-(β-diethylamino-ethyl) - 3-(4'-methyl-phenyl)-quinoxalinium chloride hydrochloride of the formula

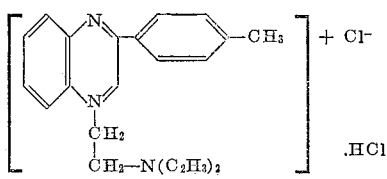

and, after recrystallization from absolute ethanol with the addition of ethyl acetate, it melts at 177–178° C. with decomposition.

Example 12

6.2 parts of N-(β-piperidino-ethyl)-orthophenylene diamine are dissolved in 30 parts by volume of absolute ethanol and the solution is rendered acid to Congo by the addition of an ethyl alcoholic solution of hydrochloric acid. After the addition of 4.2 parts of isonitroso-acetophenone the whole is caused to react and worked up as described in Example 5. The resultant 1-(β-piperidino-ethyl)-3-phenyl-quinoxalinium chloride hydrochloride of the formula

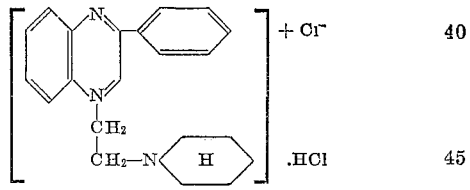

melts at 179–180° C. with decomposition.

The N-(β-piperidino-ethyl)-ortho-phenylene diamine used as starting material may be prepared as follows:

6 parts of ortho-(β-chloro-ethylamino)-nitrobenzene are heated with 13 parts of piperidine and 25 parts by volume of ethanol in a fusion tube for 12 hours at 120–125° C. The reaction liquid is evaporated in vacuo on the water bath, the residue is taken up with 2 N-hydrochloric acid, the solution is agitated with ether and rendered alkaline with a 10 N-aqueous solution of caustic soda. After saturation with sodium carbonate the alkaline mixture is extracted with ether, the ethereal solution is dried over sodium sulfate and the ether is distilled off. The residue is freed from easily volatile constituents by heating it on the water bath under 12 mm. pressure, and then hydrogenated in 80 parts by volume of ethyl acetate with 3 parts of nickel catalyst adsorbed on clay. After filtering off the nickel, the ethyl acetate is distilled off. The residue is crude N-(β-piperidino-ethyl)-ortho-phenylene diamine.

Example 13

1 part of 2-thienyl-(2')-quinoxaline is heated with 10 parts by volume of ethylene chlorhydrin for 6 hours in a fusion tube at 110–115° C. The solution is mixed with absolute ether until turbidity first appears, and is then cooled and allowed to stand. After a short time the crystallizate is separated by filtering with suction and recrystallized from absolute ethanol with the addition of absolute ether. The resulting 1-(β-hydroxyethyl)-3-thienyl-(2')-quinoxalinium chloride of the formula

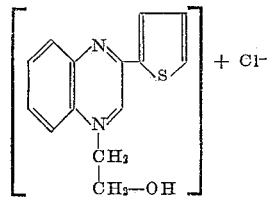

melts at 194–195° C. with decomposition.

The 2-thienyl-(2')-quinoxaline used as starting material may be prepared as follows:

25.5 parts of isonitroso-acetothienone-(2) are dissolved together with 18.5 parts of ortho-phenylene diamine in 140 parts by volume of absolute ethanol and the solution is rendered acid to Congo with an ethyl alcoholic solution of hydrochloric acid. The whole is then boiled under reflux for 30 minutes and cooled and filtered with suction. The product is recrystallized from ethanol with the addition of a small quantity of concentrated aqueous ammonia solution and the addition of water. The resulting 2-thienyl-(2')-quinoxaline melts at 117–119° C.

Example 14

3.0 parts of 2-phenyl-6-methyl-quinoxaline are heated in 10 parts by volume of absolute ethanol with 13.6 parts by volume of ethylene chlorhydrin for 6 hours in a fusion tube at 120–125° C. After filtering to separate the precipitated starting material the solution is mixed with a large quantity of absolute ether and cooled. After standing for a little time the crystallizate is separated by filtering with suction, and recrystallized from absolute ethanol with the addition of absolute ether.

The resulting 1-(β-hydroxyethyl)-3-phenyl-7-methyl-quinoxalinium chloride of the formula

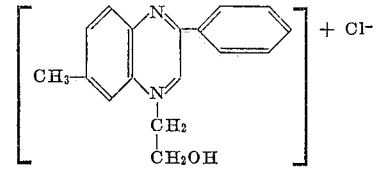

melts at 199–201° C.

Example 15

5.5 parts of N-(β-di-n-butylamino-ethyl)-ortho-phenylene diamine are dissolved in 20 parts by volume of absolute ethanol and rendered acid to Congo with an ethyl alcoholic solution of hydrochloric acid. After the addition of 3.1 parts of isonitroso-acetophenone the whole is heated at the boil for 30 minutes under reflux. The warm solution is mixed with ethyl acetate and absolute ether until turbidity appears, and is then cooled and allowed to stand. The crystallizate is separated by filtering with suction, and recrystallized from absolute ethanol with the addition of ethyl acetate and absolute ether. The resulting 1-(β-di-n-butylamino-ethyl) - 3 - phenyl-quinoxalinium chloride hydrochloride of the formula

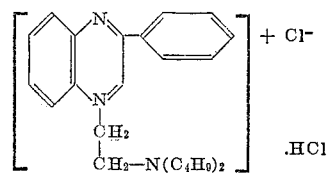

melts at 140–142° C.

The N-(β-di-n-butylamino-ethyl)-ortho-phenylene diamine used as starting material may be prepared as follows:

10 parts of ortho - (β - chlorethylamino)-nitrobenzene are heated with 13 parts of di-n-butylamine for 6 hours at 125° C. The reaction mixture is taken up, while warm, in 2 N-hydrochloric acid, and the acid solution is filtered, extracted with ether, and rendered alkaline with a 10 N-solution of caustic soda, saturated with sodium carbonate and extracted with ether. The ethereal solution is dried over sodium sulfate and the ether together with the excess of dibutylamine are distilled off in vacuo. The residue is hydrogenated in 100 parts by volume of ethyl acetate with 5 parts of a nickel catalyst adsorbed on clay. After filtration, the ethyl acetate is distilled off and the residue is distilled in vacuo. The N-(β-di-n-butylaminoethyl)-ortho-phenylene diamine is distilled under a pressure of 0.1 mm. at 145–148° C.

*Example 16*

6.6 parts of N₁-(β-diethylamino-ethyl)-4-methyl-ortho-phenylene diamine are dissolved in 50 parts by volume of absolute ethanol and the solution is rendered acid to Congo with ethyl alcohol hydrochloric acid. The whole is then heated to the boil with 6 parts of 4-chloro-isonitroso-acetophenone for 30 minutes under reflux. The whole is mixed while warm with ethyl acetate and absolute ether, and then cooled, filtered with suction, and the filter residue is recrystallized from ethanol of 90 per cent. strength with the use of animal charcoal and the addition of ethyl acetate. The product melts at 191-193° C. with decomposition. From this hydrochloride there is obtained by dissolution in water, admixture with sodium hydroxide solution and recrystallization of the precipitate from a mixture of alcohol and water, a pseudo base, probably 1-(β-diethylamino-ethyl)-3-para-chloro-phenyl- 6 -methyl -1,2- dihydro-quinoxalol-(2) of the formula.

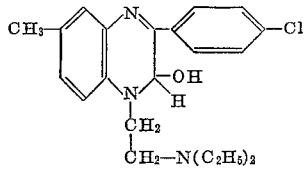

which melts at 122–123°.

*Example 17*

22.1 parts of N₁-(β-diethylamino-ethyl)-4-methyl-ortho-phenylenediamine are dissolved in 100 parts by volume of absolute ethanol. Ethyl alcoholic hydrochloric acid is admixed until the solution has an acid reaction, then 14.9 parts of isonitroso-acetophenone are added and the whole heated to the boil for 1 hour under reflux. An excess of hydriodic acid (d=1.7) is added to the solution, then ethyl acetate until turbidity first appears and the whole is then allowed to stand. After 24 hours the crystals which have formed are separated by filtering with suction, washed with ether and dissolved in water. After the addition of sodium hydroxide solution the base is extracted with ether and after drying and evaporating the ether the residue is dissolved in ethyl alcohol and converted into the iodide-hydriodide. The thus obtained 1-(β-diethylamino-ethyl) - 3 - phenyl-6-methyl-quinoxalinium-iodide-hydriodide of the formula

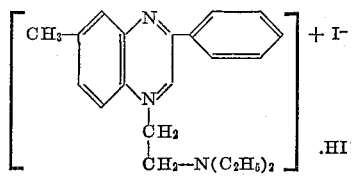

melts, after several recrystallizations from water, at 182-183° C. with decomposition.

*Example 18*

11 parts by weight of N-(γ-diethylaminopropyl)-ortho-phenylenediamine are dissolved in 100 parts by volume of absolute ethanol. Ethyl alcoholic hydrochloric acid is added until the solution begins to have an acid reaction, then 7.5 parts of isonitroso-acetophenone are added and the whole is heated for 45 minutes to the boil under reflux. After this, the solution is evaporated to dryness under reduced pressure, the residue dissolved in water, the solution freed from undissolved constituents and rendered alkaline with sodium hydroxide solution. The freed base is extracted with ether, the ethereal solution died and evaporated and the residue mixed with an excess of hydriodic acid in ethyl alcoholic solution. Absolute ether is added and crystallization sets in after some standing. The suction-filtered iodide-hydriodide is recrystallized from water and converted via the free base into the 1-(γ-diethylamino-propyl)-3-phenyl-quinoxalinium chloride hydrochloride of the formula

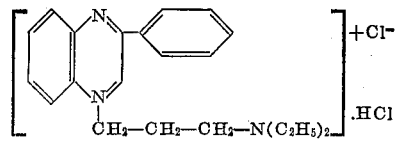

which melts at 192–194° C. with decomposition.

*Example 19*

5 parts of 2-phenyl-quinoxaline are heated with 10 parts by volume of 1-chloro-propane-di-ol(2,3) and 10 parts by volume of absolute ethanol in a fusion tube at 130–135° C. for 10 hours. Absolute ether is added until the solution begins to become turbid and then allowed to stand for crystallization. The resultant greenish product can be recrystallized from a mixture of ethanol and absolute ether. There is obtained the 1-(β,γ-dihydroxy-propyl)-3-phenyl-quinoxalinium-chloride of the formula

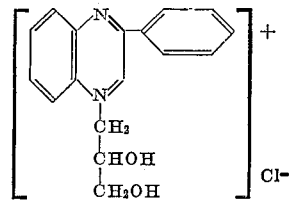

which melts at 191–193° C. with decomposition.

*Example 20*

7.1 parts of 4-chloro-phenylenediamine (1,2) are dissolved in 60 parts by volume of absolute ethanol and the solution mixed with a slight excess of ethyl alcoholic hydrochloric acid. After the addition of 7.5 parts of isonitroso-acetophenone the whole is heated to the boil for 1 hour under reflux and then allowed to cool when crystallization sets in. After cooling in ice, the product is suction-filtered and recrystallized from ethanol. The resulting 2-phenyl-chloro-quinoxaline melts at 125–127° C.

2.4 parts of 2-phenyl-chloro-quinoxaline are heated with 10 parts by volume of ethylene chlorohydrin in a fusion tube at 135–140° C. for 5 hours. After cooling, precipitated starting material is removed by filtration, and the solution mixed with absolute ether until turbidity sets in to cause the 1-(β-hydroxyethyl)-3-phenyl-chloro-quinoxalinium chloride of the formula

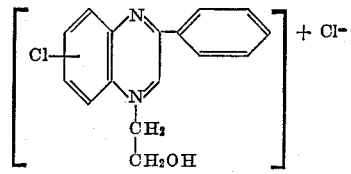

to crystallize. After recrystallization from a mixture of absolute ethanol and absolute ether it melts at 169–171° C.

*Example 21*

0.74 part of 1-(β-hydroxyethyl)-3-phenyl-1,2,3,4-tetrahydro-quinoxaline-hydrochloride is refluxed with a solution of 3 parts of potassium hydroxide and 7 parts of potassium ferricyanide in 30 parts by volume of water for 20 minutes. After cooling, there follows extraction with ether, drying of ethereal solution over sodium sulfate and evaporation. The residue is dissolved in ethyl alcoholic hydrochloric acid and crystallization of the chloride brought about with ethyl acetate. After recrystallization from a mixture of ethanol and ethyl acetate, the chloride melts at 188–190° C. with decomposition. It is identical with the 1-(β-hydroxyethyl)-3-phenyl-quinoxalinium chloride described in Example 7.

The 1-(β-hydroxyethyl)-3-phenyl - 1,2,3,4 - tetrahydroquinoxaline used as starting material can be prepared e. g. as follows:

5.7 parts of the 1-(β-hydroxyethyl)-3-phenyl-quinoxalinium-chloride described in Example 7 are hydrogenated in 80 parts by volume of methanol by means of 0.3 part of a pre-hydrogenated platinum oxide catalyst at room temperature until no more hydrogen is taken up. The filtered solution is mixed with ethyl acetate and absolute ether close to the point where it becomes turbid and then cooled.

The resultant crystallizate can be recrystallized from ethyl alcohol with the use of animal charcoal and an addition of ethyl acetate. It melts at 170–172° C. and is the 1-(β-hydroxyethyl)-3-phenyl - 1,2,3,4 - tetrahydroquinoxaline-hydrochloride.

*Example 22*

25 parts of N-(β-diethylamino-ethyl)-ortho-phenylenediamine dihydrochloride are dissolved in water and the solution rendered alkaline with dilute sodium hydroxide solution. The free base is extracted with ether and after drying and evaporating the ethereal solution refluxed for 6 hours with 28 parts of ω-bromo-meta-para-dichloroacetophenone in 100 parts by volume of ethanol. The brown-yellow solution is freed from undissolved constituents, mixed with an excess of ethyl alcoholic hydrochloric acid and then with ethyl acetate after which slow crystallization sets in. The separated salt is converted into the free base with aqueous caustic soda and from this there is obtained by means of ethyl alcoholic hydrochloric acid and ethyl acetate the 1-(β-diethylamino-ethyl)-3-meta,para-dichlorophenyl)-quinoxalinium chloride hydrochloride of the formula

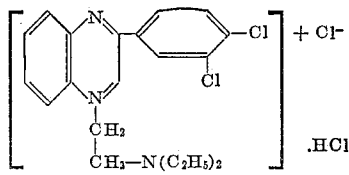

which melts at 176–178° C. with decomposition.

The ω-bromo-meta,para-dichloracetophenone used as starting material can be prepared, for example, as follows:

18.9 parts by weight of meta-para-dichloroacetophenone are dissolved in 100 parts by volume of absolute ether and 5.45 parts by volume of bromine admixed dropwise with stirring. When the reaction is complete, the solution is washed twice with water, the ether dried over sodium sulfate and evaporated. The residue is the crude ω-bromo-meta,para-dichloro-acetophenone and can be used as such for the further reactions.

*Example 23*

6.7 parts of N-[β-(β'-diethylamino-ethylthio)-ethyl]-ortho-phenylenediamine are mixed in 50 parts by volume of absolute ethanol with ethylalcoholic hydrochloric acid until it has an acid reaction. The solution is refluxed for 1 hour with 3.7 parts of isonitroso-acetophenone, mixed with an excess of hydriodic acid (d=1.7) and with ethyl acetate and absolute ether until turbidity sets in. After standing for some time the crystals which have formed are separated by suction filtering and dissolved in water. The base is freed with aqueous sodium hydroxide solution, then isolated in the usual manner by means of ether and converted in ethanolic solution into the iodide-hydriodide which crystallizes when absolute ether is added. The resulting 1-[β-(β'-diethylamino-ethylthio)-ethyl]-3-phenyl-quinoxalinium-iodide-hydriodide of the formula

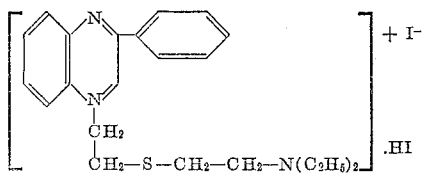

melts after recrystallization from a mixture of ethanol and ether at 128–130° C. with decomposition.

In the same manner there can be obtained with isonitroso - para-chloro - acetophenone the 1-[β-(β'-diethylamino-ethylthio)-ethyl]-3-para - chloro - phenyl - quinoxalinium-iodide-hydriodide of the formula

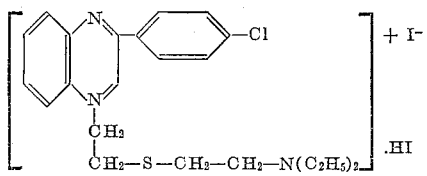

It melts at 165–168° C. with decomposition.

The N-[β-(β'-diethylamino-ethylthio) - ethyl] - ortho-phenylene diamine can be prepared for example as follows:

12 parts of β-diethylamino-ethylthiol are refluxed for 5 hours with a solution of 2.07 parts of sodium in 150 parts by volume of absolute ethanol and 18 parts of ortho-(β-chloroethylamino)-nitrobenzene, dissolved in 200 parts by volume of absolute ethanol. The solution is filtered and mixed with an excess of ethyl alcoholic hydrochloric acid, then with absolute ether, cooled, and the crystallizate separated by suction-filtering. The melting point is at 156–158° C. The product is dissolved in water, the solution rendered alkaline with aqueous sodium hydroxide solution, extracted with ether, the ethereal solution dried and evaporated and the residue hydrogenated at 30–40° C. in 220 parts by volume of ethyl acetate with 4 parts of a nickel catalyst until no more hydrogen is taken up. The residue obtained after the evaporation of the filtered ethyl acetate boils at 183–185° C. under 0.3 mm. pressure and is the N-[β-(β'-diethylamino-ethylthio)-ethyl]-ortho-phenylene diamine.

What is claimed is:

1. 1-lower hydroxyalkyl-3-phenyl-quinoxalinium salts, the anion of which is a therapeutically useful one, and which are unsubstituted in the 2-, 5-, 6-, 7- and 8-position.

2. 1 - lower dialkylaminoalkyl - 3-phenyl-quinoxalinium salts, the anion of which is a therapeutically useful one, and which are unsubstituted in the 2-, 5-, 6-, 7- and 8-position.

3. 1 - (β - diethylamino-ethyl)-3-phenyl-quinoxalinium-chloride-hydrochloride.

4. 1-(β-dimethylamino-ethyl)-3-phenyl-quinoxalinium-chloride-hydrochloride.

5. 1 - (β - hydroxyethyl)-3-phenyl-quinoxalinium-chloride.

6. 1-(β-diethylamino-ethyl)-3-(4'-chloro-phenyl)-quinoxalinium-chloride-hydrochloride.

7. 1-(β-hydroxyethyl)-3-(4'-chloro-phenyl)-quinoxalinium-chloride.

8. A member of the group consisting of 1-(R₂)-3-(R₁)- quinoxalinium salts unsubstituted in 2-position and containing the nucleus of the formula:

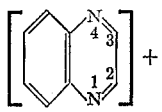

wherein $R_1$ is a member of the group consisting of phenyl, chlorophenyl, lower alkyl-phenyl and thienyl-(2), $R_2$ represents a member selected from the group consisting of lower dialkylaminoalkyl, lower dialkylaminoalkyl-thio-alkyl, piperidino-lower alkyl and lower hydroxy alkyl, and in which the carbocyclic ring of the quinoxaline nucleus is a member selected from the group consisting of an unsubstituted benzene ring and benzene rings substituted solely by members selected from the group consisting of lower alkyl groups and chlorine atoms, the anions of which quinoxalinium salts are therapeutically useful; and their free bases.

No references cited.